(12) United States Patent
Fiechtl

(10) Patent No.: US 6,189,279 B1
(45) Date of Patent: Feb. 20, 2001

(54) FLOATING FLOOR UNDERLAY

(75) Inventor: Doug Fiechtl, Acworth, GA (US)

(73) Assignee: L&P Property Management Company, South Gate, CA (US)

( * ) Notice: Under 35 U.S.C. 154(b), the term of this patent shall be extended for 0 days.

(21) Appl. No.: 09/249,212

(22) Filed: Feb. 12, 1999

(51) Int. Cl.$^7$ .................................................. E04F 15/22
(52) U.S. Cl. ...................... 52/403.1; 52/480; 52/346.04; 52/408; 428/95
(58) Field of Search ................... 52/480, 403.1; 428/95

(56) References Cited

U.S. PATENT DOCUMENTS

| | | |
|---|---|---|
| 2,648,619 | 8/1953 | Alderfer . |
| 2,983,962 | 5/1961 | Merz et al. . |
| 3,121,649 | 2/1964 | Oliver . |
| 3,230,134 | 1/1966 | Studer . |
| 3,264,166 | 8/1966 | Lowery . |
| 3,410,748 | 11/1968 | Blue . |
| 3,411,967 | 11/1968 | Rowland et al. . |
| 3,455,772 | 7/1969 | Mason et al. . |
| 3,547,753 | 12/1970 | Sutton . |
| 3,576,706 | 4/1971 | Baumann et al. . |
| 3,619,344 | 11/1971 | Wolinski et al. . |
| 3,726,754 | 4/1973 | Coglianese et al. . |
| 3,829,343 | 8/1974 | Remmert . |
| 3,874,987 | 4/1975 | Young . |
| 3,931,450 | 1/1976 | Patton, Jr. et al. . |
| 3,934,066 | 1/1976 | Murch . |
| 3,967,028 | 6/1976 | Müller et al. . |
| 3,989,869 | 11/1976 | Neumaier et al. . |
| 4,037,013 | 7/1977 | Sprague . |
| 4,046,587 | 9/1977 | Guglielmo, Sr. . |
| 4,087,296 | 5/1978 | Hooker . |
| 4,172,917 | 10/1979 | Angelle et al. . |
| 4,263,727 | 4/1981 | Bender et al. . |
| 4,328,652 | 5/1982 | Naumovich, Jr. . |
| 4,336,089 | 6/1982 | Asperger . |
| 4,423,103 | 12/1983 | Bogdany . |
| 4,581,274 | 4/1986 | Johns et al. . |
| 4,828,635 | 5/1989 | Flack et al. . |
| 4,974,382 | 12/1990 | Avellanet . |
| 5,045,389 | * 9/1991 | Campagna ......................... 428/316.6 |
| 5,147,481 | 9/1992 | Deblander . |
| 5,443,885 | 8/1995 | Wilson . |
| 5,501,895 | 3/1996 | Finley et al. . |
| 5,578,363 | 11/1996 | Finley et al. . |
| 5,617,687 | 4/1997 | Bussey, Jr. et al. . |
| 5,707,903 | 1/1998 | Schottenfeld . |
| 5,766,721 | 6/1998 | Bussey, Jr. et al. . |
| 5,925,579 | * 7/1999 | Neuner et al. ......................... 442/175 |
| 5,968,630 | * 10/1999 | Foster ...................................... 428/77 |

* cited by examiner

Primary Examiner—Carl D. Friedman
Assistant Examiner—Patrick J. Chevez
(74) Attorney, Agent, or Firm—Wood, Herron & Evans, L.L.P.

(57) ABSTRACT

A floating floor system for installation over a subfloor. The underlay has a polymer film with a relatively low coefficient of friction between itself and a floating floor cast to a relatively thin and dense open-celled foam with a relatively high coefficient of friction between itself and the subfloor. Also contemplated is a method for installing the underlay between the subfloor and the floating floor, wherein the foam surface of the underlay is placed against the subfloor and the floating floor is positioned onto the film layer of the underlay.

29 Claims, 2 Drawing Sheets

FIG. I

FLOATING FLOOR UNDERLAY

FIELD OF THE INVENTION

This invention relates to floating floor systems. More particularly, this invention relates to a floating floor underlay product and method of installing a floating floor over a subfloor.

BACKGROUND OF THE INVENTION

Products installed on top of a subfloor and under a floor treatment that aid in the floor treatment's installation are known in the art. Often, it is desirable to prevent a floor treatment from absorbing moisture that seeps up through a subfloor that may cause a floor treatment to degrade or swell, potentially causing the flooring to buckle to lift away from the subfloor, causing, for example, premature glue-joint failure. A problem associated with prior art underlays applied between the floor treatment arid subfloor is that their installation tends to be overly complicated and difficult. One example of a known underlay product uses a layer of low density thermoplastic foam applied over a subfloor. This foam is generally porous and allows moisture to seep up through the foam and contact the floor treatment, which may thereby damage the floor treatment in the manner mentioned above. In order to prevent this problem, a second layer of thermoplastic film must be installed over the layer of foam to act as a moisture barrier. The foam layer and the film layer tend to shift and fold during installation and must be adhesively tacked both together and to the subfloor so that shifting or folding is minimized when laying the floor treatment. Also, the low density foam used in this system allows vertical impacts, e.g., foot falls, to resonate and be amplified through the floor treatment where the treatment is laminate wood flooring, for example, resulting in an undesirably loud floor installation.

Another underlay system uses a compressed rigid fiberboard in conjunction with a thermoplastic layer. The fiberboard is directly applied to a subfloor in small sheets. Small sheets of the rigid fiberboard installed side by side result in a large number of joints in the assembled underlay which must be sealed. The large number of joints to be sealed increases the probability of premature joint failure from repeated foot falls to the joints since the rigid fiberboard sheets tend not to give but, rather, to separate relative to each other. As with the above example, in order to make this underlay moisture impermeable, a thermoplastic film must be adhesively tacked to the fiberboard. The fiberboard and film assembly degrades and literally falls apart over time due to repeated vertical impacts to the floor treatment, i.e., walking over the floor. Once the fiberboard fails, a soft spot is created under the floor treatment which leads to an uneven surface and, ultimately, failure of the floor treatment above the degraded underlay region. This construction is also susceptible to amplifying the sound of foot falls.

Certain foams are unsuitable for use as flooring underlay. For instance, a polyethylene foam is a closed cell foam, the closed cells being under slightly positive pressure from the physical blowing agent captured therein, formed during the foaming process. The closed cells are what give the foamed product its resiliency and much of its thickness. If the foam cells are ruptured, the foam loses its resiliency and thickness and creates a dead spot in the foam that leads to degradation of the floor treatment, and increased noise as mentioned above.

OBJECTIVES OF THE INVENTION

It has therefore been an object of the present invention to provide an underlay for a floating floor that facilitates floating floor installation without bunching, folding, or sliding of the underlay product before or during installation of the floating floor.

Another object of the present invention is to provide a thin underlay for a floating floor with acoustic damping characteristics superior to those of the prior art in a one piece composite that resists bunching, folding, or sliding prior to or during installation of the floating floor.

It is another object of the present invention to provide a method of installing a floating floor over a subfloor.

SUMMARY OF THE INVENTION

The objectives of the present invention are achieved by providing in the preferred embodiment a composite underlay product for a floating floor made from a moisture impermeable vinyl film to which an open cell latex foam is directly cast. The open cell latex foam allows lateral and vertical moisture transmission therethrough. As used herein, the vinyl film creates a moisture impermeable underlay when laid over a subfloor and under a floating floor and seams created between abutting sheets of underlay are sealed with moisture impermeable tape.

The latex foam surface of the composite underlay has a relatively high coefficient of friction between itself and a subfloor so that when placed against the subfloor prior to installation of a floating floor, the underlay grips the subfloor and does not shift and fold. The vinyl film surface of the composite underlay has a relatively low coefficient of friction between itself and a floating floor so that when the floating floor is installed against this film surface of the underlay, the floating floor easily slides over the film surface, preventing bunching of the composite underlay. Because the film is permanently cohered to the foam, no bunching or separation occurs between the two components of the underlay during installation or use.

The underlay of the present invention is thin, dense and soft producing low durometer readings on the Shore 00 Scale. This combination acts as an efficient acoustic dampener to absorb noise created by foot falls transmitted through the floating floor and also absorbs more kinetic energy than polyethylene foam underlays. The latex foam is of open cellular structure. As a result, the underlay does not lose its resiliency and will not degrade beneath a floating floor over time due to repeated vertical impacts, thereby prolonging the life of the floating floor.

Also contemplated is a method for installing the underlay between the subfloor and the floating floor, wherein the subfloor is cleaned of debris, the foam surface of the underlay is placed against the subfloor and position the floating floor onto the film layer of the underlay. Seams formed between strips of underlay are optionally taped.

DETAILED DESCRIPTION OF THE PREFERRED EMBODIMENT

Figure 1:
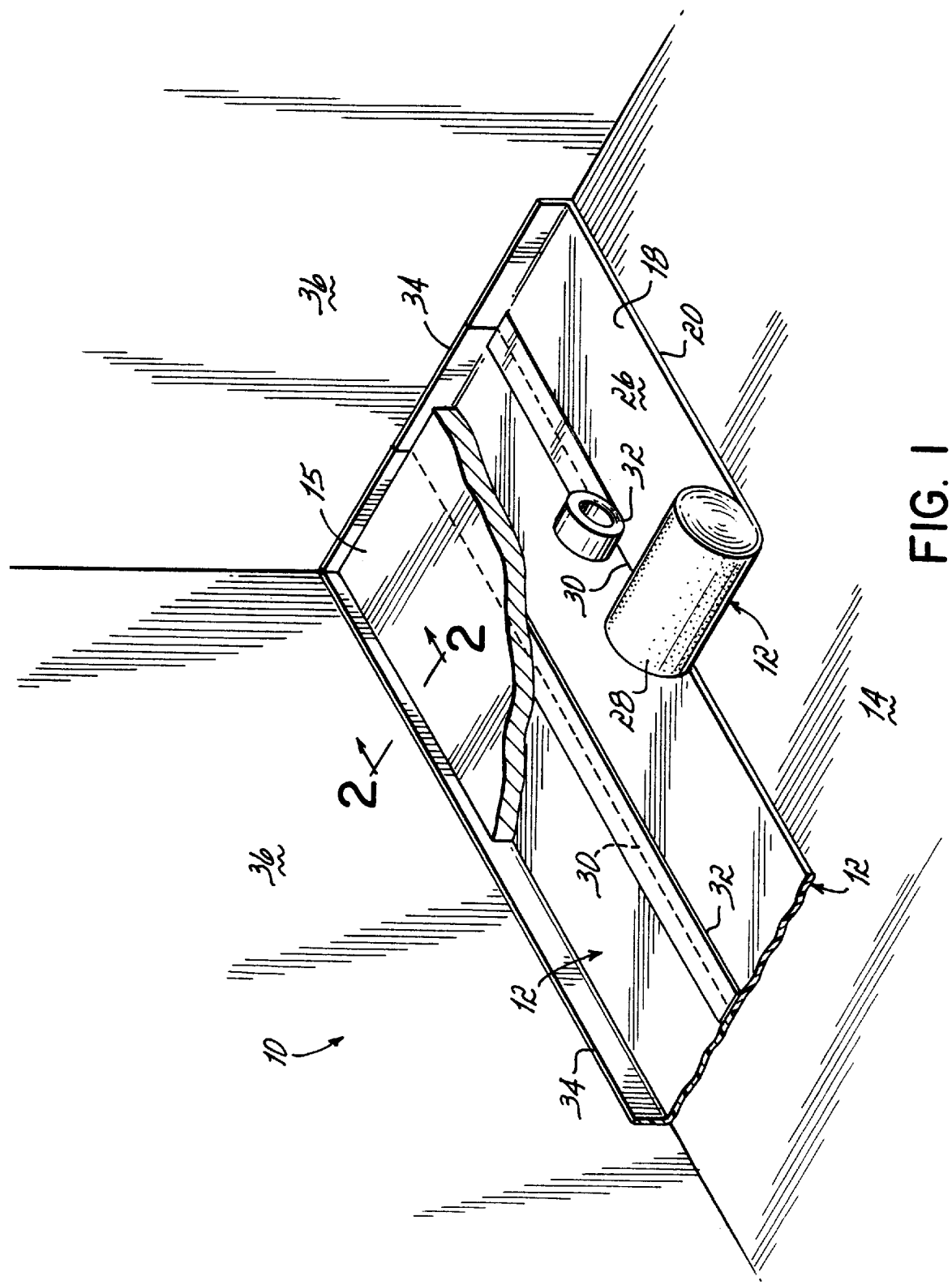
FIG. 1 is a partially cutaway perspective view of the installation of a floating floor according to the present inventive system.
Figure 2:
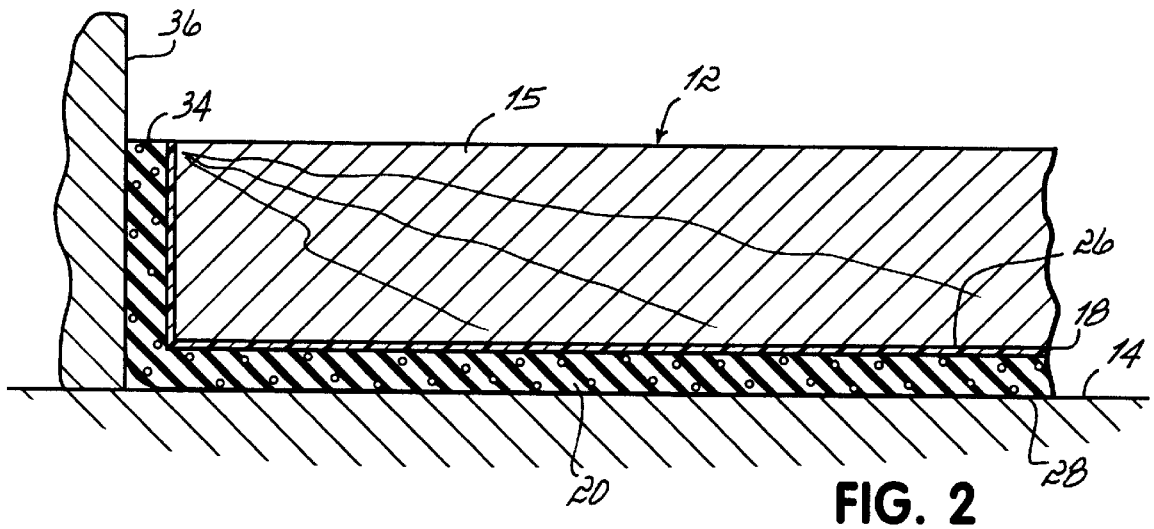
FIG. 2 is a cross section of FIG. 1 taken along line 2—2.
Figure 3:
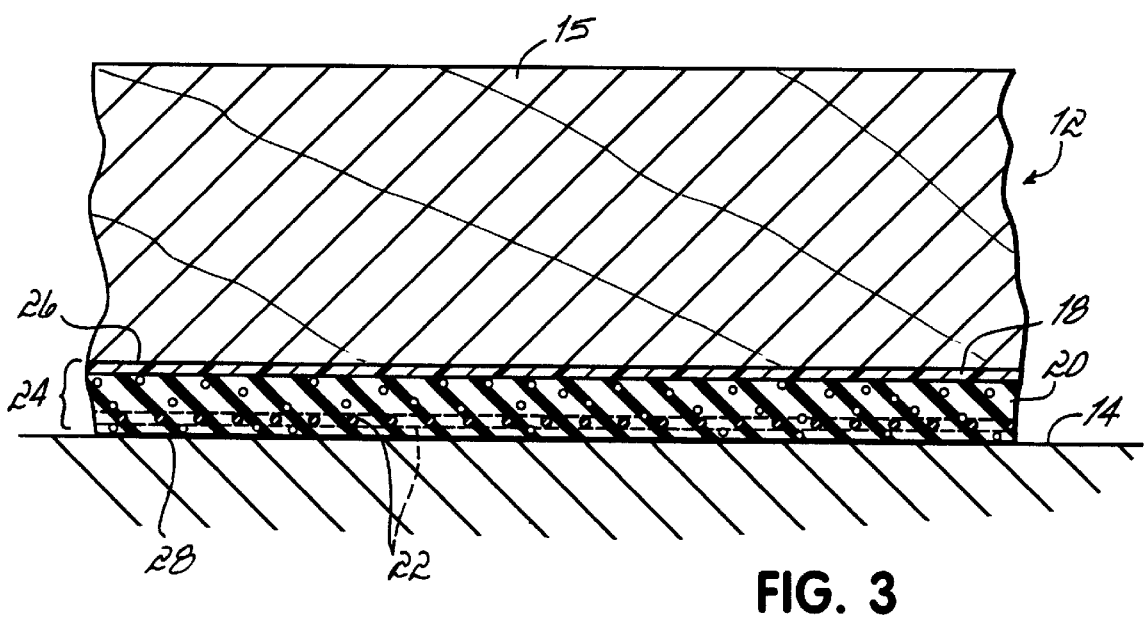
FIG. 3 is a close-up view of the cross section of FIG. 2 showing an alternative embodiment of the underlay.

As is seen generally in FIGS. 1–3, in the preferred embodiment of the present inventive system 10 for installing a floating floor 15 over a subfloor 14, an underlay 12 is laid over the subfloor 14 made of concrete, wood, or other materials common in subfloor construction. The floating floor 15, e.g., vinyl flooring, modular wood flooring and the like, is thereafter placed against the underlay 12.

The underlay 12 is a composite of a moisture impermeable film 18 cohered to an open-celled foam 20. As will be understood herein, the term "cohered" means any suitable process known in the art to permanently join the film 18 to the foam 20, including, for example, direct casting and laminating. As will be understood herein, the term "moisture impermeable" means a water transmission value of less than 0.007 oz/yd$^2$/hr (239 mg/m$^2$/hr). In the preferred embodiment, the film 18 is polyvinylchloride or polyurethane. However, other moisture impermeable polymer films may be used, e.g., polyethylene, polypropylene. In order to be moisture impermeable, the thickness of the film 18 used is important. The film 18 should be no less than 0.002 inches (0.005 cm) thick, with a preferred range of about 0.002 inches (0.005 cm) to about 0.008 inches (0.02 cm) thick, and have a weight in the range of about 2.0 oz/yd$^2$(67.5 g/m$^2$) to about 8.0 oz/yd$^2$ (269.9 g/m$^2$).

In the preferred embodiment, the film 18 is manufactured by calendaring. As will be understood by those in the art, the film 18 may be manufactured by any other suitable process, e.g., extrusion and blowing.

In the preferred embodiment, the foam 20 is an open-celled, mechanically frothed expanded latex foam. As will be understood herein, the term "open-celled" means having the characteristic property of allowing air or moisture to pass therethrough. In the preferred embodiment, the foam 20 has a density greater than 10 lb/ft$^3$ (160.2 kg/M$^3$), with a preferred range of about 11 to about 15 lb/ft$^3$ (176.2 to 240.28 kg/M$^3$). Also in the preferred embodiment, the foam 20 has a thickness in the range of about 0.045 inches to about 0.1 inches (0.11 cm to 0.25 cm), with a preferred thickness of 0.075 inches (0.19 cm). Because the foam 20 is open celled, the underlay 12 allows moisture to travel both laterally and vertically therethrough. In order to make the underlay 12 moisture impermeable when installed under a floating floor 15, seams 30 between abutting strips of underlay 12 must be sealed, as discussed further below.

As can be seen in Table 1, samples of a latex foam in accordance with the principles of the present invention have a much lower average durometer value on the Shore 00 Scale when compared to samples of closed cell polyethylene foam over thirty-six runs. Also, the latex foam samples in Table 1 have a much higher density (11.23 lb/ft$^3$) (179.9 kg/m$^3$), than the polyethylene foam samples (2.11 lb/ft$^3$) (33.8 kg/m$^3$), tested above. This combination of lower durometer value and higher density relative to closed cell polyethylene foam imparts desirable sound damping characteristics to the latex foam when used as a component of an underlay. Thus, a thin, pliable and soft, yet relatively dense latex foam 20 has sound damping characteristics that tend to muffle and deaden typical low frequency acoustic energy generated by walking over an undampened floating floor as is discussed further below. Open-celled polyvinylchloride and polyurethane foams may also be used in the underlay 12 in place of the latex foam 20.

Table 2 shows results of three separate tests performed to measure the sound emitted from a golf ball dropped onto a floating floor surface with no underlay, a polyethylene foam underlay and a latex foam underlay in accordance with the present invention, from a height of 12 inches. The test was performed with Extech Instruments 407736 sound level meter conforming to IEC 651, ANSI S1.4 TYPE 2 at 18 inches from the point of impact. The floating floor was placed over a concrete subfloor. The sound level meter was placed 18 inches from the intended impact of the golf ball off of, but immediately adjacent to an edge of the floating floor measuring sound resonating through the floating floor. The sound level meter was set to detect and hold the maximum sound level emitted by the floating floor when the golf ball was dropped thereon. This was repeated twenty times for each of the floating floor with no underlay, floating floor with polyethylene foam underlay, and floating floor with latex foam underlay. As seen in Table 2, the values of the same floating floor with no underlay, polyethylene underlay, and a latex foam underlay in accordance with the present invention are compared. A nearly 3 dB average reduction in sound intensity is achieved by the latex foam underlay over no underlay and a nearly 2.5 dB reduction over the polyethylene underlay.

As is seen in Table 3, a latex foam underlay in accordance with the present invention absorbs kinetic energy better than a polyethylene foam underlay. In order to test the kinetic energy absorption of a latex foam underlay in accordance with the present invention compared to the kinetic energy absorption of a polyethylene foam underlay, a golf ball was first dropped from an elevated surface of constant height onto a concrete subfloor and its rebound height from the subfloor is recorded to achieve a baseline value for the golf ball's rebound. This procedure is repeated a number of times in order to calculate a baseline average value of kinetic energy absorbed of the golf ball bouncing off the baseline target for comparison to the amount of kinetic energy absorbed by each underlay product.

Next, different thicknesses of each underlay product were placed on the subfloor, each thickness of each underlay being subjected to the same number of golf ball drops. The average rebound of the golf ball from each -thickness of each underlay was measured.

Each time the golf ball is dropped from the constant height onto the subfloor, latex foam underlay target and polyethylene foam underlay target, the ball has a first potential energy prior to being dropped. At the top of the ball's rebound from each of the aforementioned respective surfaces, the ball, at its rebound apex, has a second potential energy. The ball's second potential energy when rebounding from the respective underlays was compared with the second potential energy of the golf ball rebounding from the subfloor, and the difference therebetween represents the kinetic energy absorbed by the latex foam and polyethylene foam underlays.

The latex foam underlay tested had a density of 11.8 lb/ft$^3$ (189.0 kg/m$^3$), and the polyethylene foam underlay tested had a density of 2.1 lb/ft$^3$ (33.6 kg/m$^3$). The test was performed by dropping a golf ball onto various thickness of each underlay from a height of 37.5 inches (93.5 cm). Various thicknesses were used to eliminate the tendency for the underlays to "bottom out" under impact. The rebound height of the golf ball from each underlay was recorded and the percentages of kinetic energy absorbed was calculated by comparing the second potential energy from the golf ball rebound off each underlay to the potential energy of the golf ball at its rebound apex when dropped onto the subfloor. This is a test to determine the ability of each product to absorb and distribute energy within the product. The latex foam 1 underlay absorbed, on average, almost three times as much kinetic energy as the polyethylene foam underlay of the same thickness, as seen in Table 3.

TABLE 1

Laminate Floor Underlay Hardness Comparison
Shore 00 Durometer Scale

| Latex Foam | Polyethylene Foam | Latex Foam | Polyethylene Foam |
|---|---|---|---|
| 26 | 48 | 30 | 48 |
| 32 | 48 | 26 | 49 |
| 28 | 48 | 22 | 48 |
| 25 | 44 | 27 | 49 |
| 24 | 47 | 28 | 48 |
| 26 | 50 | 24 | 44 |
| 22 | 44 | 25 | 47 |
| 22 | 50 | 28 | 45 |
| 20 | 50 | 25 | 45 |
| 23 | 43 | 32 | 47 |
| 26 | 47 | 27 | 45 |
| 27 | 48 | 24 | 48 |
| 26 | 46 | 32 | 50 |
| 24 | 44 | 28 | 47 |
| 25 | 46 | Average | 25.6 | 47.2 |
| 25 | 43 | Standard Deviation | 3.0 | 2.4 |
| 22 | 51 | Maximum | 32 | 52 |
| 26 | 48 | Minimum | 20 | 43 |
| 23 | 50 | Density | 11.23 | 2.11 |

TABLE 1-continued

Laminate Floor Underlay Hardness Comparison
Shore 00 Durometer Scale

| Latex Foam | Polyethylene Foam | Latex Foam | Polyethylene Foam |
|---|---|---|---|
| 26 | 49 | lb/ft$^3$ | lb/ft$^3$ |
| 20 | 52 | 179.9 | (33.8 kg/m$^3$) |
| 25 | 44 | kg/m$^3$) | |

TABLE 2

Drop Test Sound Intensity Comparison

| No Underlay dB | PE Underlay dB | Latex Underlay dB |
|---|---|---|
| 93.5 | 94.3 | 91.7 |
| 93.3 | 94.6 | 91.7 |
| 93.8 | 93.8 | 91.7 |
| 93.8 | 94 | 91.3 |
| 94 | 94.1 | 91.6 |
| 94.4 | 93.9 | 91.2 |
| 93.8 | 94.5 | 91.8 |
| 94.3 | 93.6 | 91.6 |
| 94 | 93.8 | 91.7 |
| 94.2 | 93.9 | 91.3 |
| 94.6 | 93.5 | 91.9 |
| 95 | 94.3 | 91.9 |
| 94.6 | 93.9 | 91.6 |
| 94.5 | 94 | 91 |
| 94.5 | 93.6 | 91.1 |
| 94.9 | 94.1 | 91.9 |
| 94.6 | 94.1 | 91.2 |
| 94.8 | 94.1 | 91.6 |
| 94.8 | 93.7 | 91.7 |
| 94.5 | 93.6 | 91.7 |
| Average 94.3 | 94.0 | 91.6 |
| vs. no underlay | 0.3 | 2.7 |
| vs. PE underlay | | 2.4 |

TABLE 3

Kinetic Energy Absorption Comparison

| Configuration | | Drop Height | | Latex Combination Kinetic Energy Absorbed | Polyethylene Kinetic Energy Absorbed |
|---|---|---|---|---|---|
| Inches | (cm) | inches | (cm) | percentage | percentage |
| 0 | (0) | 37.5 | (95.3) | na | na |
| 0.09 | (0.22) | 37.5 | (95.3) | 16.0% | 14.7% |
| 0.18 | (0.46) | 37.5 | (95.3) | 33.3% | 12.7% |
| 0.27 | (0.69) | 37.5 | (95.3) | 52.0% | 16.0% |
| 0.36 | (0.91) | 37.5 | (95.3) | 72.0% | 17.3% |
| Average | | | | 43.3% | 15.2% |

In the preferred embodiment, the foam 20 is directly cast to the film 18, by a process known in the art. It will be understood by those in the art that the foam 20 and the film 18 components also may be cohered together by any suitable process known in the art, e.g., adhesively bonding, or la minating the foam 20 and film 18 components together.

In an alternative embodiment (FIG. 3), the foam 20 is cohered to a carrier 22, e.g., a polymer textile, for example, a spuncast, extruded or carded needle-punched homopolymer or a copolymer of polyester, polypropylene, polyethylene, polyolefin, polyamide or acrylic material or other woven or knitted natural fibers to create a substrate composite 24. The foam 20 is cohered to the carrier 22 by any suitable process known in the art. In the preferred embodiment, the carrier 22 has a thickness in the range of about 0.006 inches (0.015 cm) to about 0.025 inches (0.06 cm) and has a weight in the range of about 0.4 (13.6 g/m$^2$) to about 2.0 oz/yd$^2$ (67.8 g/m$^2$). The film 18 is then cohered to the substrate composite 24 by any suitable process known in the art.

The underlay 12 of both embodiments has a first face 26 comprised of the film 18 and a second face 28 comprised of the foam 20. In the preferred embodiment of the system 10, the second face 28 has a coefficient of friction greater than 0.8 between itself and the subfloor 14, so that when the second face 28 is installed against the subfloor 14, the friction between the subfloor 14 and the second face 28 prevents slipping and bunching relative to each other. While the coefficient of friction of the second face 28 is greater than 0.8 between itself and the subfloor 14, in the preferred embodiment, the material from which the subfloor 14 is made determines how high the coefficient of friction of the second face 28 must be in order to prevent slipping and bunching during installation.

In the preferred embodiment, the first face 26 has a coefficient of friction between itself and the floating floor 16 less than 0.8, preferably in the range of about 0.4 to 0.7, and most preferably about 0.6. The first face 26 must be relatively slippery, compared to the second face 28, since installation of the floating floor 16 generally consists of sliding the floating floor 16 over the first face 26 during the installation process. The relatively low coefficient of friction of the first face 26 in contact with the underside of the floating floor 16 prevents bunching or tearing of the underlay 12 when the floating floor 16 is slid into place during installation.

In the preferred embodiment, the film 18 has a tensile strength of greater than about 2500 psi (176 kg/cm$^2$) in the machine direction, an elongation of less than 250% in the machine direction, a tensile strength of greater than about 2500 psi (176 kg/cm$^2$) in the cross-machine direction and elongation of less than 250% in the cross-machine direction. In the most preferred embodiment, the film has a tensile strength of about 3158 psi (222.5 kg/cm$^2$) in the machine direction, an elongation of less than 222% in the machine direction, a tensile strength of about 2874 psi (202.1 kg/cm$^2$) in the cross-machine direction, and a elongation of lass than 231% in the cross-machine direction.

In the preferred method of installation of the present inventive system, the subfloor 14 is first prepared by sweeping or vacuuming in order to remove dirt or other foreign articles that may tear the underlay 12, making it difficult for the underlay 12 to grip the subfloor 14, or otherwise cause irregularities in the underlay 12 after installation.

The underlay 12 is then laid over the subfloor 14 so that the second face 28 is against the subfloor 14. It will be understood by those in the art that the underlay 12 may be manufactured to any desired dimensions. In the most preferred method, 30 inch (0.76 cm) wide sheets of the underlay 12 are laid on the subfloor 14 so that their edges abut each other. Seams 30, defined by abutting sheets of underlay 12, are then sealed by tape 32 in order to create a moisture impermeable underlay 12. As is mentioned above, if the seams 30 are not taped, moisture may travel horizontally through the foam 20 and migrate up through the seams 30. In the preferred method, the tape 32 is 2 inches (5 cm) packing tape having a water insoluble adhesive such as is readily available from the 3M Corporation. It will be understood by those in the art that any suitable sealant may be used to fix the sheets of underlay 12 in relation to each other and prevent moisture from the subfloor 14 from seeping up through the seams 30.

When installing the floating floor system 10, the underlay 12 is laid on the subfloor 14 so as to leave the underlay edge 34 riding up a wall 36, as shown in FIG. 2. The floating floor 16 is then slid across the second face 26 of the underlay 12 to be located at any desired position. The underlay edge 34 may be thereafter trimmed to the room size or concealed by a strip of moulding (not shown).

From the above disclosure of the detailed description of the present invention and the preceding summary of the preferred embodiment, those skilled in the art will comprehend the various modifications to which the present invention is susceptible. Therefore, I desire to be limited only by the scope of the following claims and equivalents thereof.

I claim:

1. A floating floor underlay for placement between a subfloor and a floating floor, comprising:
    an open-celled foam sheet consisting of latex, polyvinylchloride or polyurethane; and
    a moisture impermeable polymer film cohered to said foam sheet.

2. The underlay of claim 1, wherein said foam is cast to said film.

3. The underlay of claim 1, wherein said foam sheet is adapted to be placed against a subfloor so as to create a coefficient of friction of greater than 0.8.

4. The underlay of claim 1, wherein said film is adapted to be placed against a floating floor so as to create a coefficient of friction of less than 0.7.

5. The underlay of claim 4, wherein said film is adapted to be placed against a floating floor so as to create a coefficient of friction of about 0.6.

6. The underlay of claim 1, wherein said foam has a density greater than 10 lb/ft$^3$ (160.2 kg/M$^3$).

7. The underlay of claim 1, wherein said foam has a thickness in the range of about 0.045 inches (0.11 cm) to about 0.1 inches (0.25 cm).

8. The underlay of claim 1, comprising a carrier to which said foam is cohered.

9. A floating floor underlay for placement between a floating floor and a subfloor, comprising:
    an open-celled foam adapted to be placed against a subfloor so as to create a coefficient of friction greater than 0.8, said open-celled foam having a density greater than 10 lb/ft$^3$ (160.2 kg/m$^3$), and a thickness in the range of about 0.045 inches (0.11 cm) to about 0.1 inches (0.25 cm), said foam consisting of latex, polyvinylchloride or polyurethane, and
    a moisture impermeable polymer film to which said foam is cast, said film adapted to be placed against a floating floor so as to create a coefficient of friction in the range of about 0.4 to about 0.7.

10. A floating floor underlay for placement between a subfloor and a floating floor, comprising:
   a moisture impermeable polyvinylchloride film adapted to be placed against a floating floor so as to create a coefficient of friction of about 0.6; and
   an open-celled foam sheet cast to said film, said foam being adapted to be placed against a subfloor so as to create a coefficient of friction greater than 0.8, wherein said foam sheet consists of latex, polyvinylchloride, or polyurethane having a density greater than 10 lb/ft$^3$ (160.2 kg/m$^3$) and a thickness of about 0.075 inches (0.19 cm).

11. A floating floor underlay for placement between a floating floor and a subfloor, comprising:
   a moisture impermeable polyvinyl bichloride film adapted to be placed against a floating floor so as to create a coefficient of friction of about 0.6; and
   an open-celled foam sheet cast to said film, said foam sheet being adapted to be placed against a subfloor so as to create a coefficient of friction greater than 0.8, wherein said foam sheet consists of latex, polyvinylchloride, or polyurethane having a density greater than 10 lb/ft$^3$ (160.2 kg/m$^3$), and a thickness of about 0.075 inches (0.19 cm); and
   a textile carrier cohered to said foam sheet.

12. A floating floor system, comprising:
   a subfloor;
   an underlay having an open-celled foam consisting of latex, polyvinylchloride or polyurethane cohered to a moisture impermeable polymer film, wherein said foam is located against said subfloor; and
   a floating floor located again said film.

13. The system of claim 12, wherein said foam is cast to said film.

14. The system of claim 12, wherein said foam is adapted to be placed against said subfloor so as to create a coefficient of friction of greater than 0.8.

15. The system of claim 12, wherein said film is adapted to be placed against said floating floor so as to create a coefficient of friction in the range of about 0.4 to about 0.7.

16. The system of claim 15, wherein said film is adapted to be placed against said floating floor so as to create a coefficient of friction of about 0.6.

17. The system of claim 12, wherein said foam has a density greater than 10 lb/ft$^3$ (160.2 kg/m$^3$).

18. The system of claim 12, wherein said foam has a thickness in the range of about 0.045 inches (0.11 cm) to about 0.1 inches (0.25 cm).

19. The system of claim 12, comprising a carrier to which said foam is cohered.

20. A floating floor system, comprising:
   a subfloor;
   an underlay having an open-celled foam adapted to be placed against said subfloor so as to create a coefficient of friction greater than 0.8, said open-celled foam having a density greater than 10 lb/ft$^3$ (160.2 kg/m$^3$), and a thickness in the range of about 0.045 inches (0.11 cm) to about 0.1 inches (0.25 cm), said foam consisting of latex, polyvinylchloride or polyurethane cast to a moisture impermeable polymer film, wherein said foam is located against said subfloor; and
   a floating floor adapted to be placed against said film so as to create a coefficient of friction in the range of about 0.4 to about 0.7.

21. A floating floor system, comprising:
   a subfloor;
   an underlay having an open-celled foam adapted to be placed against said subfloor so as to create a coefficient of friction greater than 0.8, said open-celled foam having a density greater than 10 lb/ft$^3$ (160.2 kg/m$^3$), and a thickness of about 0.075 inches (0.19 cm), said foam consisting of latex, polyvinylchloride or polyurethane cast to a moisture impermeable polymer film, wherein said foam is located against said subfloor; and
   a floating floor adapted to be placed against said film so as to create a coefficient of friction of about 0.6.

22. A floating floor system, comprising:
   a subfloor;
   an underlay having an open-celled foam cohered to a carrier and adapted to be placed against said subfloor so as to create a coefficient of friction greater than 0.8, said open-celled foam having a density greater than 10 lb/ft$^3$ (160.2 kg/m$^3$), and a thickness of about 0.075 inches (0.19 cm), said foam consisting of latex, polyvinylchloride or polyurethane cast to a moisture impermeable polymer film, wherein said foam is located against said subfloor; and
   a floating floor adapted to be placed against said film so as to create a coefficient of friction of about 0.6.

23. A method for installing a floating floor over a subfloor, comprising the steps of:
   laying an underlay including an open-celled foam sheet consisting of latex, polyvinylchloride or polyurethane over the subfloor, said underlay having first and second faces and adapted to create a coefficient of friction greater than 0.8 between said first face and the subfloor; and
   locating the floating floor adjacent the second face of the underlay, the second face adapted to create a coefficient of friction between itself and the floating floor in the range of about 0.4 to about 0.7.

24. The method of claim 23, comprising the step of:
   0trimming said underlay to desired dimensions.

25. The method of claim 23, comprising the steps of:
   laying plural sheets of said underlay over the subfloor;
   abutting adjacent sheets of said underlay, forming seams therebetween; and
   sealing said seams with moisture impermeable tape.

26. A floating floor underlay, comprising:
   an open-celled foam sheet consisting of latex, polyvinylchloride or polyurethane, adapted to create a coefficient of friction with a subfloor greater than 0.8; and
   a moisture impermeable polymer film adapted to create a coefficient of friction with a floating floor of less than about 0.7, wherein said foam sheet is cast to said film.

27. In combination, a floating floor underlay, a subfloor and a floating floor, said underlay comprising:
   an open-celled foam sheet adapted to create a coefficient of friction of greater than 0.8 with the subfloor; and
   a moisture impermeable polymer film cohered to said foam sheet.

28. The underlay of claim 27, wherein said film is adapted to create a coefficient of friction of less than 0.7 with the floating floor.

29. The underlay of claim 28, wherein said film is adapted to create a coefficient of friction of about 0.6 with the floating floor.

* * * * *

UNITED STATES PATENT AND TRADEMARK OFFICE
CERTIFICATE OF CORRECTION

PATENT NO. : 6,189,279 B1
DATED : February 20, 2001
INVENTOR(S) : Doug Fiechtl

It is certified that error appears in the above-identified patent and that said Letters Patent is hereby corrected as shown below:

Column 1,
Line 16, change "buckle to lift" to -- buckle or to lift --.
Line 19, change "arid" to -- and --.

Column 2,
Line 13, change "one piece" to -- one-piece --.
Lines 60-61, change "and position the floating floor onto the film layer of the underlay" to -- and the floating floor positioned onto the film layer of the underlay --.

Column 3,
Lines 46 and 48, change "$M^3$" to -- $m^3$ --.
Line 51, change "open celled" to -- open-celled --.

Column 4,
Lines 1 and 4, change "damping" to -- dampening --.
Line 56, "from each-thickness" to -- from each tickness --.

Column 5,
Line 8, change "thickness" to -- thicknesses -- and change "latex foam 1 underlay" to -- latex foam underlay --.

Table 1, change "179.9 Kg/$m^3$" to -- (179.9 Kg/$m^3$) --.

Column 7,
Line 5, change "la minating" to -- laminating --.
Line 58, change "a elongation of lass" to -- an elongation of less --.

Column 8, claim 6,
Line 49, change "$M^3$" to -- $m^3$ --.

Column 9, claim 11,
Line 16, change "polyvinyl bichloride" to -- polyvinylchloride --.

UNITED STATES PATENT AND TRADEMARK OFFICE
CERTIFICATE OF CORRECTION

PATENT NO. : 6,189,279 B1
DATED : February 20, 2001
INVENTOR(S) : Doug Fiechtl

It is certified that error appears in the above-identified patent and that said Letters Patent is hereby corrected as shown below:

Column 9, claim 12,
Line 34, change "again said film" to -- against said film --.

Column 10, claim 24,
Line 40, change "Otrimming" to -- trimming --.

Signed and Sealed this

Sixteenth Day of April, 2002

Attest:

JAMES E. ROGAN
Attesting Officer    Director of the United States Patent and Trademark Office